Aug. 5, 1958  E. L. MILLER  2,846,488
PREPARATION OF HYDROGENATION CATALYSTS
Filed July 27, 1955
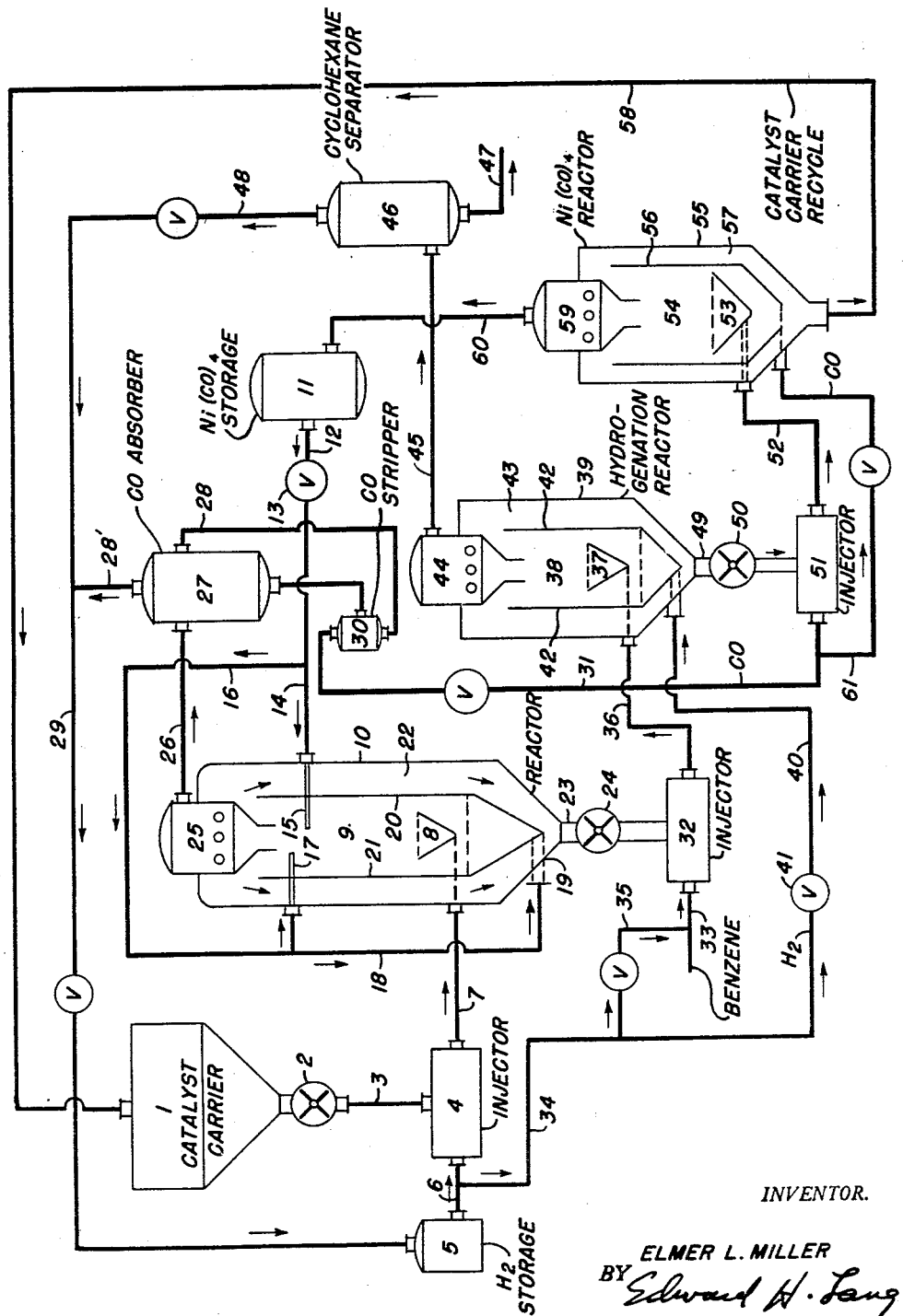
INVENTOR.
ELMER L. MILLER
BY Edward H. Lang
ATTORNEY 2,846,488
Patented Aug. 5, 1958

2,846,488

PREPARATION OF HYDROGENATION CATALYSTS

Elmer L. Miller, Cary, Ill., assignor to The Pure Oil Company, Chicago, Ill., a corporation of Ohio Application July 27, 1955, Serial No. 524,689

7 Claims. (Cl. 260—667)

This invention relates to a method of preparing catalytic compositions and more particularly to a method of preparing supported, metal-film catalysts suitable for use in processes catalyzed by the presence of free metal, such as the hydrogenation of unsaturated hydrocarbons at low temperatures and pressures.

It is known to prepare metal-containing catalysts by the deposition of fine layers or particles of metal on extended surfaces. The speed of reactions, particularly hydrogenation, is stated to be proportional to the amount of catalyst surface exposed. Various carriers and fibres have been used on which to support the deposited metal. The finely divided, free metal may be attained by decomposition of the metal carbonyl compound, by disintegration of a metal electrode, or through the use of various metal-spraying techniques. In the latter method, a mist of small droplets of molten metal is caused to impinge upon a cooled, hard surface and the resulting metal particles, ranging from 5 to 100 microns in size, fall into a collecting means. It is also known in the art to prepare heavy metal catalysts by precipitating a metal salt on a carrier and treating the carrier while in a fluidized condition with a reducing or oxidizing atmosphere to convert the metal salt to the free metal or oxide. Molten glass has been introduced in droplet form into a hot stream of inert gas in a solidifying zone whereby the glass droplets are gradually cooled and separated into phases by heat treatment and dissolution of one of the phases.

These prior art methods have paid little attention to the control of the deposition of the metal on the carrier, whereby any particular lattice structures of metal crystals may be formed, or to the influence of lattice structure on the activity of the resulting supported catalyst. In accordance with the present invention, it has been found that thermally unstable metal compounds can be converted into free metal particles or vapor which, when in the presence of a finely divided carrier substance under fluidized conditions, yields a metal coating of extreme thinness having an increased number of points of nonuniformity or catalytic activity. It has further been found that such a catalyst can be prepared for immediate use in a reaction, also under fluidized conditions, to great advantage and that the used catalyst can be continuously removed from the reaction zone for treatment in a carbonyl-forming atmosphere to separately recover the metal and carrier for recycle to the catalyst preparation reaction. Another important aspect of the invention lies in the finding that the use of fluidized conditions gives greater control over the catalyst preparation reaction so that the thermally unstable metal compound can be brought to its decomposition temperature and decomposed in a short time without sintering the catalytic metal surface therefrom, and that a catalyst prepared in this manner is extremely active and may be used immediately as formed to great advantage.

Accordingly, a primary object of this invention is to provide a method of preparing a supported metal catalyst under fluidized conditions.

Another object is to provide a catalyst composition containing a metal-coated carrier material which is utilizable as formed under fluidized conditions.

A further object of the invention is to provide an integrated process of catalyst preparation, catalyst utilization and catalyst regeneration wherein the metal film of high activity is continuously deposited on a carrier, the finished catalyst is separated in a manner to obtain those particles of highest activity, and the catalyst after use under fluidized conditions is recovered and the film redeposited by recycle of the reformed metal compound and carrier to the initial step.

These and other objects will become apparent and be described as the invention is developed herein.

In order to more clearly define the invention without limitation of the scope thereof, reference is made to the drawing which represent a flow diagram of one embodiment of the invention.

Referring to the flow diagram, the process may be carried out as follows: Catalyst support or carrier in hopper 1 is fed through star-feeder 2 and line 3 into injector 4 where it is mixed with hydrogen from tank 5 passing through line 6. The mixture is injected through line 7 into spray device 8 within catalyst preparation zone 9 of catalyst preparation reactor 10. Nickel carbonyl stored in tank 11 is passed through line 12 and valve 13 into line 14 whereby it is injected into zone 9 by injector 15. A portion of the nickel carbonyl is sent through line 16 to enter injector 17 at the top part of zone 9, and through line 18 to enter injector 19 in the bottom of zone 9.

The reaction in zone 9 is carried out at about 40° to 100° C., and preferably around 50° C., under pressures ranging from 0 to 50 p. s. i. g. whereby the nickel carbonyl is decomposed to form free nickel and carbon monoxide. The support is maintained in a fluidized condition in zone 9 in thorough mixture with the decomposing nickel carbonyl whereby a very thin and active coating of nickel is placed upon the extended surfaces of the support. The fluidized mixture gradually rises within zone 9 and the heavier support particles are passed over weirs 20 and 21 into annular zone 22 passing downward into catalyst leg 23 controlled by star-feeder 24. At the top of the reactor 10, cyclone separator 25 separates hydrogen and carbon monoxide from catalyst fines. The hydrogen and carbon monoxide pass through line 26 into carbon monoxide absorber 27, which is operated by means known to the art, such as with an ammoniacal copper salt solution entering at line 28.

Hydrogen from absorber 27 is passed through line 28' into line 29 for return to storage tank 5. The copper salt solution containing absorbed carbon monoxide passes into steam stripper 30. Recovered carbon monoxide passes overhead into line 31. The freshly prepared catalyst, at a temperature of about 25° to 100° C., passes from star-feeder 24 into lower part of catalyst leg 23 and into injector 32. Benzene from an outside source enters injector 32 via line 33 where it is mixed with hydrogen from lines 34 and 35. The mixture of hydrogen and benzene from injector 32 passes to line 36 into spray device 37 within zone 38 of hydrogenation reactor 39. Additional hydrogen is conveyed to lines 34 and 40, controlled by valve 41, into the bottom of reactor 39 whereby adequate fluidization is maintained in zone 38. The ascending reaction mixture and fluidized catalyst reaches the upper part of the reactor where separation takes place and the used catalyst passes over weir 42 into annular zone 43. Cyclone separator 44 separates catalyst fines from hydrogen and cyclohexane which pass from line 45 into separator 46. Separator 46 serves to condense out the cyclohexane, which leaves separator 46 by line 47. Hydrogen passes through line 48 back to line 29 for re-use in the process. The operating conditions within zone 38 are 25° to 50° C., and atmospheric to 50 p. s. i. g.

Used catalyst from zone 43 passes into catalyst leg 49, and is controlled by star-feeder 50 and passed into injector 51. Carbon monoxide from separator 27 passing through line 30 is passed into injector 51 to mix with the used catalyst. The mixture from injector 51 passes through line 52 into dispersing means 53 located within zone 54 of nickel carbonyl reactor 55. Zone 54 is operated at 20° to 30° C. under atmospheric conditions to 50 pounds per square inch. Under these conditions, the nickel film on the support material reacts with the carbon monoxide to form nickel carbonyl. The support, thus freed, passes over weir 56 into annular zone 57 and is recycled by line 58 back to support-hopper 1. Catalyst fines are separated from the nickel carbonyl by cyclone separator 59 for return of the carbonyl via line 60 to storage tank 11. Additional carbon monoxide may be injected through line 61 into the bottom of zone 54.

Various metal compounds, including halides and carbonyls, may be used to prepare catalysts in accordance with the invention. Some of the reactions involved are as follows:

*Chromium*

(1) $Cr(CO)_6 + H_2 \rightarrow Cr + Cr_3C_2 + Cr_2O_3$

This reaction takes place at about 450 to 625° C. under about 0.04 to 0.22 mm. of total gas pressure. Chromium carbonyl begins to decompose at about 200° C. As far as is known, the compound cannot be reformed from metallic chromium but is made by conversion of the halide salts.

*Molybdenum*

(2) $Mo(CO)_6 + H_2 \rightarrow Mo + (C,H,O)$

Free molybdenum forms readily at 450° to 750° C. under 0.75 mm. total gas pressure. The by-products of the reaction have not been identified as yet. Molybdenum carbonyl decomposes at about 150° C. and may be reformed from the free metal at 200° C. and 130 atm. pressure.

*Tungsten*

This reaction takes place at 500° to 800° C. at about 10 mm. total gas pressure:

$W(CO)_6 + H_2 \rightarrow W + (C,H,O)$

Ruthenium, rhodium, osmium, and iridium undergo decomposition at about 600° C. This may be represented by a ruthenium halocarbonyl, or a ruthenium halo-yttrium-carbonyl.

$RuX_2 \cdot YCO \rightarrow Ru + X_2 + CO$

Other metal carbonyls which decompose to yield free metals are those of iron, nickel, and cobalt. Iron carbonyl may be completely decomposed at 180° C. and is formed at high pressure and temperature. Nickel carbonyl begins to decompose at 36° C. and is formed at ordinary temperature and pressure. Cobalt carbonyl begins to decompose at 51° C. and forms at 150° C. and 40 atmospheres' pressure. Other metal compounds which are decomposable to the free metal are, titanium bromide, zirconium bromide, tantalum chloride, and tungsten chloride.

The invention is illustrated by the following example:

Ten gms. of activated alumina of 230 square meters per gram surface area is fluidized in a glass tube heated to 60° C. by a stream of hydrogen. After steady fluid conditions are obtained, the hydrogen is passed through a saturator containing nickel carbonyl held at 25° C., and thence through the alumina. After 20 minutes the gas stream is switched back to pure hydrogen and the catalyst flushed for 30 minutes while being cooled to 25° C. From the recovered $Ni(CO)_4$, it can be determined that 31.5% of the $Ni(CO)_4$ is decomposed depositing 3.68 grams of nickel on the alumina. This corresponds to 97% of a monatomic layer of nickel on the alumina.

When a mixture of 75% hydrogen and 25% ethylene is passed over the catalyst at 25° C., the exit gas contains 68% hydrogen, 27% ethane, and 5% ethylene, corresponding to a conversion of 86%, at the end of 5 minutes. At the end of 10 minutes the conversion drops to 4%.

When hydrogen saturated with $Ni(CO)_4$ is passed for one hour, thereby depositing about 3 atomic layers of nickel on the alumina, only 8% conversion of ethylene to ethane is obtained at the end of 5 minutes.

The deposition of a very thin or monatomic film of free metal on the extended surfaces of a carrier is a matter of control of several variables, i. e., the total surface area of the carrier, the atomic spacing of the metal lattice formed, the rate of decomposition of the metal compound and the degree of fluidization. It must be assumed first that all or substantially all of the free metal formed in the presence of the carrier is deposited on the surface thereof and that the fluidization is complete. The atomic spacing of the metals of group VIII of the periodic table, particularly nickel, cobalt and iron, is substantially the same and equivalent spacing will be found for chromium and molybdenum in group VI. The rate and conditions of decomposition of the various metal compounds are different and, consequently, the time of contact, the temperature, pressure and through-put rate are the primary variables with which to be concerned in affecting the deposition of a monatomic film of metal on the carrier.

The rates of reaction or decomposition of the metal compounds are known and thus the time required to produce a given weight of free metal can be calculated. The surface areas of the carriers are known. Accordingly, by control of the temperature of decomposition and flow rate of the gaseous stream to the fluidized carrier zone, a reasonable control over the amount of free metal deposited on the carrier surface is had. Sufficient free metal is formed to cover the known surface area of the carrier in a monatomic film and since the contact is under fluidized conditions, even distribution is assured.

In the example given, the time and flow rate were regulated so that 3.68 grams of nickel were deposited on the alumina, corresponding to 97% of a monatomic layer of nickel. When the time of contact is three times longer with the same flow rate and nickel carbonyl decomposition rate, a proportionately larger amount of nickel is deposited. This gives a lower activity and lower conversion rate.

It is thus seen that by control of the deposition of the nickel layer on the alumina through the use of a fluidized carrier so that a monatomic layer is obtained, the resulting catalytic activity is greatly increased. The thickness of the metallic layer is a function of time, temperature and degree of contact. The decomposition of the metal compound is conducted at a temperature of about 20° to 40° C. above the temperature at which the metal carbonyl or compound is known to begin to decompose. Thus the decomposition of cobalt carbonyl is carried out at about 71° to 91° C. Iron carbonyl can best be deposited in a monatomic film at about 100° to 180° C. Chromium carbonyl is broken down to a monatomic layer of free chromium at about 220° to 240° C. The advantage of the present process is that the use of the carrier in a fluidized condition promotes the formation of monatomic films over the entire carrier surface before 2 or 3 atomic layers are formed and the time is greatly reduced. It is also seen that greater catalyst activity and conversion per unit of deposited metal on the carrier surface is obtainable by the use of the technique of this invention. Furthermore, by the present method the finished catalyst is in its most active form and is immediately available for use in a reaction without the necessity of further treatment. The support for the catalyst may be any non-carbiding carrier material such as silica gel, alumina, silica-alumina mixtures, various synthetic aluminas, clays and other naturally occurring carriers which are capable of fluidization and which have extended surfaces. The carrier should have from 100 to 400 square meters surface per gram surface area and be relatively inert under the conditions of use and catalyst preparation. The carrier particles may be any shape. Spheroidal carrier particles, as are now commonly used in fluid cracking catalyst compositions, are very desirable forms. The fluidization may be conducted under space velocities ranging from 0.5 ft. per second to 50 ft. per second.

Control of the time of contact during the metal compound decomposition step is an important consideration. Where a given amount of the metal compound decomposes completely in a matter of 20 to 30 minutes the formation of a monatomic film is assured if the carrier and metal compound are in contact for that length of time. For some metal compounds which decompose quickly, shorter contact times will be necessary. Also, control of the amount of decomposable metal compound per unit of carrier is an important consideration. Good conversions can be obtained from catalysts prepared using small amounts of metal compound in relation to the pore or surface capacity of the carrier where all of the deposited metal is present on the carrier surface in monatomic form but not all of the carrier surface is utilized. The highest catalytic activity is obtained and the best conversion realized when all of the carrier surface is covered or coated with a monatomic film of the metal catalyst.

What is claimed is:

1. The method of conducting catalytic reduction reactions in the presence of a free metal catalyst which comprises passing a finely-divided support material into a catalyst preparation zone, maintaining said support material in a fluidized state therein by passage of a reducing atmosphere through said catalyst preparation zone, introducing a heat-decomposable carbonyl compound of said metal into said fluidized zone of support material, maintaining said catalyst preparation zone at a temperature above the temperature at which said metal carbonyl decomposes into the free metal and carbon monoxide, separating said carbon monoxide from the gaseous effluent from said catalyst preparation zone, separating catalytic metal-coated support material from said catalyst preparation zone, utilizing said metal-coated support material as the catalyst in a reduction reaction in a separate reactor, recovering spent metal-coated support material from said separate reactor, passing said spent metal-coated support material in admixture with a sufficient quantity of said carbon monoxide to reform the metal carbonyl therefrom into a second reactor, and separately recovering the support material and said metal carbonyl from said second reactor for recycle to said catalyst preparation zone.

2. The method in accordance with claim 1 in which said heat-decomposable metal carbonyl is at least one material from the group consisting of nickel carbonyl, cobalt carbonyl, iron carbonyl, molybdenum carbonyl, tungsten carbonyl and chromium carbonyl.

3. The method in accordance with claim 2 in which said metal carbonyl is nickel carbonyl and said reduction reaction is the hydrogenation of benzene to cyclohexane.

4. The method in accordance with claim 1 in which the temperature of said catalyst preparation zone is at least 20° C. above the temperature at which the metal carbonyl begins to decompose to free metal and carbon monoxide.

5. The method in accordance with claim 1 in which the support material is at least one material selected from the group consisting of silica gel, activated alumina, and silica-alumina.

6. The method of conducting catalytic hydrogenation reactions in the presence of a free metal catalyst which comprises passing a finely divided support material into a catalyst preparation zone, maintaining said support material in a fluidized state therein by passage of hydrogen through said catalyst preparation zone, introducing a heat-decomposable carbonyl compound of said metal into said fluidized zone of support material, maintaining said catalyst preparation zone at a temperature of at least about 20° C. higher than the temperature at which said metal carbonyl compound decomposes into the free metal and carbon monoxide, separating said carbon monoxide from the gaseous effluent containing hydrogen by treatment with an absorbent therefor, stripping the carbon monoxide from said absorbent, separating catalytic metal-coated support material from said catalyst preparation zone, utilizing said metal-coated support material as the catalyst in the hydrogenation of benzene to cyclohexane in a separate fluidized reactor, recovering spent metal-coated support material from said separate reactor, passing said spent metal-coated support material in admixture with said carbon monoxide in sufficient quantity to reform the metal carbonyl therefrom in a second reactor, separately recovering said support material and said metal carbonyl from said second reactor, and recycling said support material and said metal carbonyl to said catalyst preparation zone.

7. The method in accordance with claim 6 in which the support material is activated alumina, the metal carbonyl is nickel carbonyl, the catalyst preparation zone is operated at 40° to 100° C. and pressures of from 0 to 50 p. s. i. g., the second reactor is operated at 25° to 50° C. and atmospheric pressure to 50 p. s. i. g., the second reactor is operated at 20° to 30° C. under atmospheric pressure to 50 p. s. i. g., and the absorbent for the carbon monoxide is an ammoniacal copper salt solution.

References Cited in the file of this patent

UNITED STATES PATENTS

| | | |
|---|---|---|
| 1,251,202 | Ellis | Dec. 25, 1917 |
| 2,373,501 | Peterson | Apr. 10, 1945 |
| 2,508,743 | Bruner | May 23, 1950 |
| 2,533,071 | Vesterdal et al. | Dec. 5, 1950 |